United States Patent [19]
Nishitani et al.

[11] Patent Number: 6,108,905
[45] Date of Patent: *Aug. 29, 2000

[54] METHOD AND STRUCTURE FOR ASSEMBLING METER MODULES TO VEHICLES

[75] Inventors: Keizo Nishitani; Minoru Kubota, both of Shizuoka, Japan

[73] Assignee: Yazaki Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/651,675

[22] Filed: May 21, 1996

[30] Foreign Application Priority Data

May 24, 1995 [JP] Japan ................................ 7-124859

[51] Int. Cl.[7] ............................................. H01R 43/00
[52] U.S. Cl. ....................................... 29/869; 29/464
[58] Field of Search .............................. 248/27.1, 27.3; 29/464, 466, 857, 868, 869

[56] References Cited

U.S. PATENT DOCUMENTS 4,354,566  10/1982  Yuda ..................................... 29/464 X
4,672,732   6/1987  Ramspacher et al. ................. 29/464 X

FOREIGN PATENT DOCUMENTS 7-96774   4/1995   Japan .

*Primary Examiner*—S. Thomas Hughes
*Assistant Examiner*—Marc W. Butler
*Attorney, Agent, or Firm*—Armstrong, Westerman, Hattori, McLeland & Naughton

[57] ABSTRACT

A method is disclosed which is for assembling to an automotive instrument panel a meter module having incorporated therein meters, their control circuits. On an outer wall (9a) of a meter module (A) is provided a guide projection (10) extending in a fitting direction. On a ceiling wall (12a) of a meter-module receiving portion (12) of an instrument panel (P) is provided a guide recess (13) for receiving therein the guide projection (10). The meter module (A) is received into the meter-module receiving portion (12), with the guide projection (10) inserted in the guide recess (13), followed by coupling connectors (5a) on the part of the meter module (A) and connectors (16) attached to a wiring harness (15) together. The working efficiency during assembly of meter modules to a vehicle is improved, while contributing to a reduction in weight of meter modules.

4 Claims, 5 Drawing Sheets

METHOD AND STRUCTURE FOR ASSEMBLING METER MODULES TO VEHICLES

BACKGROUND OF THE INVENTION

1. Field of the Invention

This invention relates to a method and a structure for assembling a meter module to an automotive instrument panel, which meter module incorporates therein meters, their control circuits and the like.

2. Description of the Related Art

To form electric circuits in and around an automotive instrument panel, wiring harnesses—which embody predetermined circuits—are conventionally manually laid along the body of an automobile and the dashboard of the instrument panel, followed by coupling connectors attached to the wiring harnesses to those on the part of the switches and meters.

Meanwhile, in accordance with the electronization and advanced electric control in automobiles, the instrument panel in front of a driver is provided with an increasing number of switches and meters, resulting in the related circuits complicated and thus in a fat and heavy wiring harness. Difficulty is encountered in housing such wiring harnesses in a limited space, resulting in their assembling work found troublesome and inefficient.

Under these circumstances, there is proposed, for simplifying electric circuits in an around the instrument panel, a meter module M in Japanese Patent Application Laid-Open Specification No. 96774/1995, which is as shown in FIG. 4. The meter module M comprises a cluster module d and a finish panel e attached at the front of the cluster module d. The cluster module d comprises an instrument board a implemented with meters/indicating lamps and their drive circuits, an electric junction box b distributing an electric supply and input/output signals for on-vehicle electric equipment including the above-mentioned meters/indicating lamps, and a switch unit c having switches for the on-vehicle electric equipment, all of which are integrally combined together.

The meter module M, as shown in FIG. 5, is fitted in a predetermined position in the instrument panel f, and connectors i and h respectively attached to the meter module M and to a wiring harness g on the vehicle side are coupled together to electrically connect the meter module M and the wiring harness g.

Meter modules such as that mentioned above allow electric wires or cables to be simplified, but are inevitably of large size for a module structure due to an increase in the number of components and the like which result from the increased complexity of their internal circuits. As a result, such meter modules become difficult to position accurately for their assembly to the instrument panel, resulting in their connectors largely displaced from proper position for coupling with mating connectors attached to wiring harnesses on the vehicle side, and thus in the working efficiency lowered.

As a countermeasure to the above, knock pins may be employed for accurate positioning. There is a drawback, however, that due to the increase in size and weight of the module structure, knock pins are subject to damages during the position-adjusting operation of the module structure for assembly of the latter to the instrument panel, and require cautious handling.

SUMMARY OF THE INVENTION

This invention has been accomplished to overcome the above problem and an object of this invention is to provide a method and a structure for assembling a meter module to a vehicle, which each provides a good working efficiency during assembly of the meter module to the vehicle and also serves to attain a relatively light-weight meter module. The term "meter module" used herein is intended to mean an electric unit having integrally combined therein switches and meters and their control electronic components, flexible printed circuit boards and the like.

In order to attain the object, according to an aspect of this invention, there is provided a method for assembling to a vehicle a meter module having incorporated therein switches and meters and electric circuits for controlling the switches and meters, which comprises: fitting the meter module into a meter-module receiving portion in the vehicle, with first guide means provided on an outer wall of the meter module slidingly engaged with second guide means provided on an inner wall of the meter-module receiving portion, the first guide means projecting in a fitting direction of the meter module to the vehicle, while coupling a connector on the meter module part to a connector attached to a wiring harness on the vehicle side.

Preferably, the first guide means comprises a projection of T-shaped cross section, and the second guide means comprises a complementary recess.

Preferably, the meter module comprises a meter module main body and a finish panel, and the first guide means is provided on the part of the finish panel.

Preferably, the meter-module receiving portion is therein provided with an outlet of a defroster duct, and the meter module is provided with a defroster opening and a defroster hood around the defroster opening, which projects in the fitting direction of the meter module to the vehicle and is of such size as to fit into the outlet of the defroster duct.

According to another aspect of this invention, there is provided a structure for assembling to a vehicle a meter module having incorporated therein switches and meters and electric circuits for controlling the switches and meters, which comprises: first guide means provided on an outer wall of the meter module; and second guide means provided on an inner wall of a meter-module receiving portion in the vehicle for sliding engagement with the first guide means on the meter module when fitting the meter module into the meter-module receiving portion.

Preferably, the first guide means comprises a projection of T-shaped cross section, and the second guide means comprises a complementary recess.

Preferably, the meter module comprises a meter module main body and a finish panel, and the first guide means is provided on the part of the finish panel.

With the method and the structure according to this invention, the first guide means provided on the meter module is slidingly engaged with the second guide means provided on the meter-module receiving portion of an automotive instrument panel or the like when mounting the meter module into the meter-module receiving portion. Consequently, the meter module is easily accurately positioned, thereby improving the working efficiency during its assembly to the vehicle. The lengths of wiring harnesses up to respective connectors are also shortened, thereby making a contribution to a reduction in weight of meter modules. Further, since the positioning can be smoothly effected, the assembling steps can be automated even for assembling to vehicles large meter modules containing much electric equipment and complicated internal circuits.

The above and other objects, features and advantages of this invention will become apparent from the following

DESCRIPTION OF THE PREFERRED EMBODIMENT

Embodiments of this invention will now be described with reference to the attached drawings.

Figure 1:
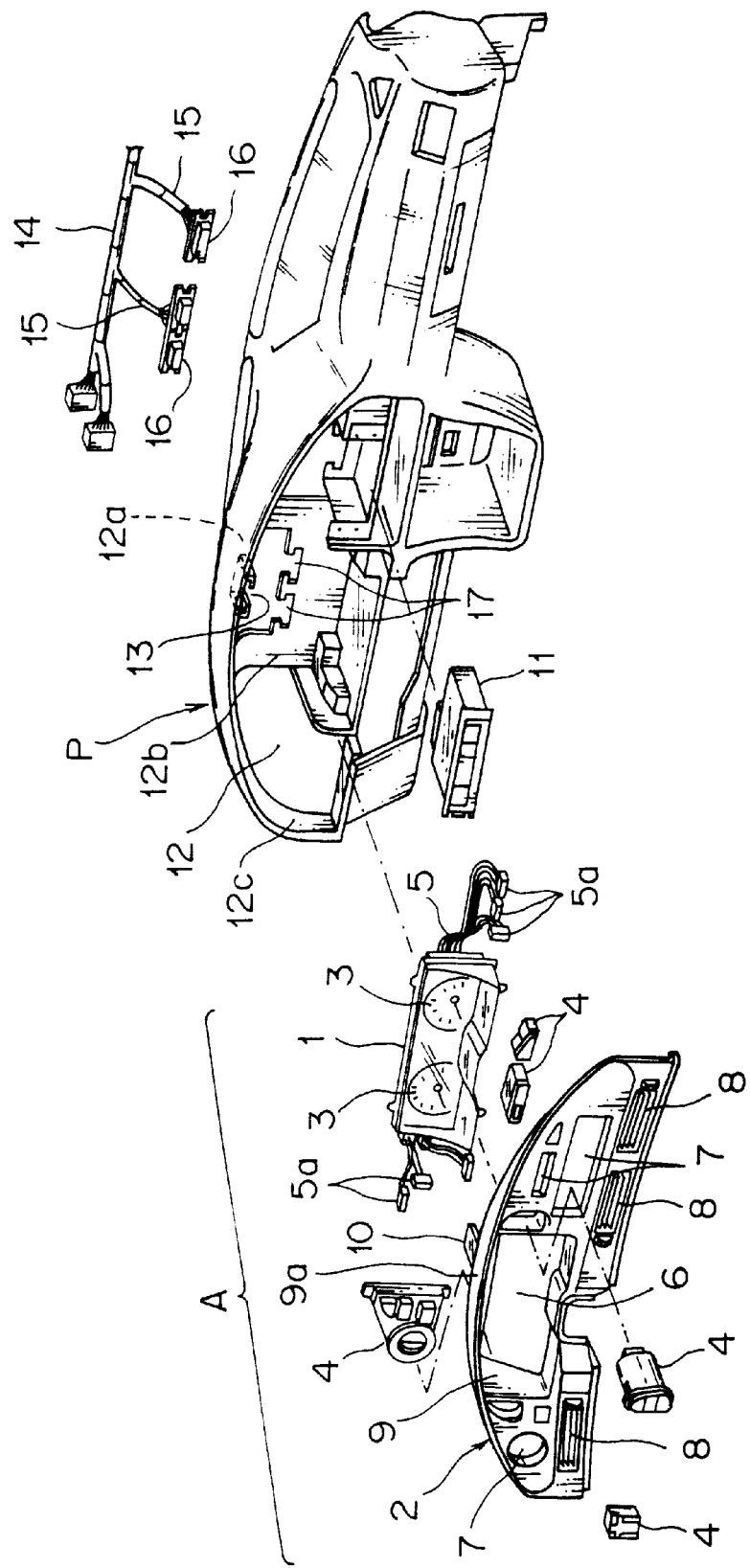
FIG. 1 is an exploded view of a meter module and an instrument panel which are used with a method according to one embodiment of this invention.

Referring to FIG. 1, a meter module A comprises an instrument board 1—which constitutes the main body of the meter module and which is at the front equipped with various meters 3 and switches 4—and a finish panel 2 attached to the front of the instrument board 1. The instrument board 1 is at the rear implemented with not-shown control circuits comprised of a printed circuit board and various electric components, to which control circuits are connected wiring harnesses 5 with connectors 5a at the end.

The finish panel 2 has an arcuated shape flange 9a complementary to that of a meter-module receiving portion 12 of an instrument panel P and is at a substantially intermediate portion thereof formed with a meter-window 6 for receiving therein the meters 3 on the instrument board 1. The finish panel 2 is provided on left and right sides of the meter-window 6 with switches 4 and openings 7 for receipt therein of operating portion 11 of an air conditioner, and at a lower portion with defroster openings 8, 8.

Figure 2:
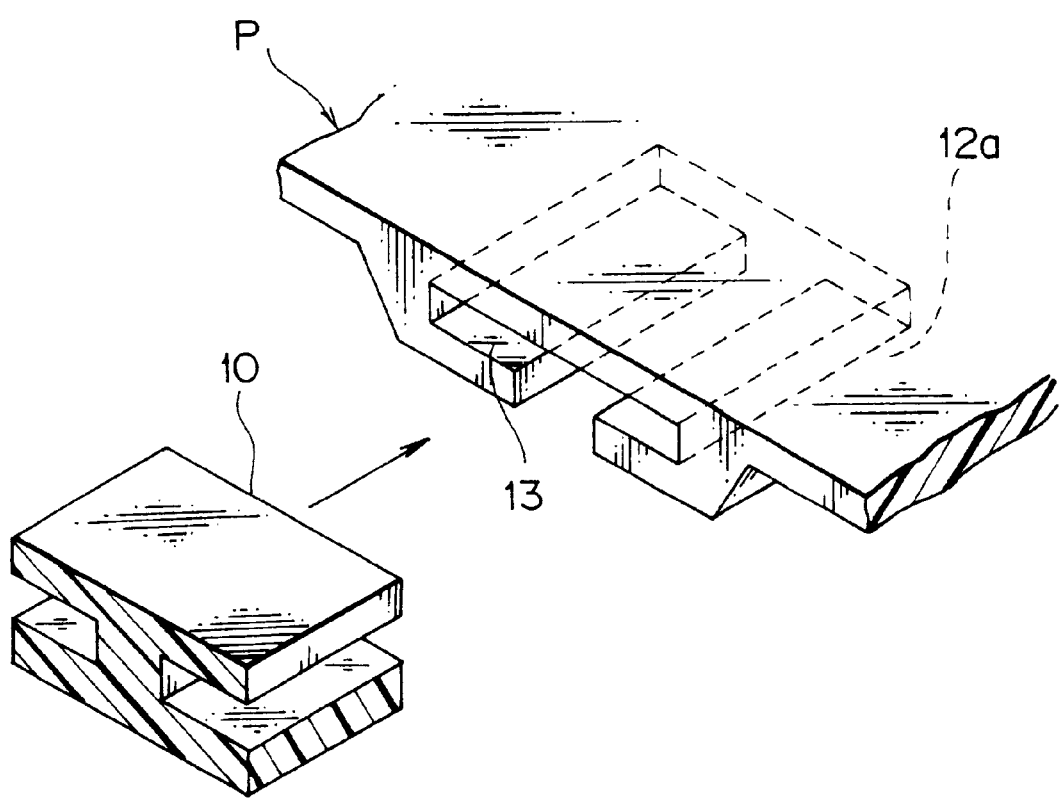
FIG. 2 is an explanatory view of a guide projection and a corresponding guide recess in FIG. 1.

The meter-window 6 is circumferentially surrounded with a hood 9 which is on an upper wall 9a integrally provided with a guide projection 10 of T-shape cross section projecting towards the instrument panel P, as shown in FIGS. 1 and 2.

The instrument board 1 is fixed to the finish panel 2 by means of screws or the like, and switches 4 and air-conditioner operating portion 11 are mounted in place in the finish panel 2 in assembling the meter module A.

The meter-module receiving portion 12 of the instrument panel P is on a ceiling wall 12a is provided with a guide recess 13, as shown in FIGS. 1 and 2 for receiving therein the guide projection 10. On a rear wall 12b, adjacent an introduction opening 13, are formed openings 17 for mounting therein connectors 16 attached to the ends of sub-wiring harnesses 15 branched from a wiring harness 14 on the vehicle side.

The steps for assembling the meter module A to the instrument panel P will now be described.

The connectors 16 of the sub-wiring harnesses 15 are first mounted in the connector-receiving openings 17 on the rear wall 12b of the meter-module receiving portion 12 of the instrument panel P.

The meter module A is then brought close to the meter-module receiving portion 12 of the instrument panel P, and the connectors 5a attached to the wiring harnesses 5 from the instrument board 1 are coupled to their respective connectors 16 of the sub-wiring harnesses 15.

Thereafter, the meter module A is advanced into the meter-module receiving portion 12 of the instrument panel P, with the guide projection 10 provided on the finish panel 2 of the meter module A inserted into the guide recess 13 on the instrument panel P, followed by fixing the meter module A to a circumferential wall 12c of the meter-module receiving portion 12 by means of screws or the like.

Figure 3:
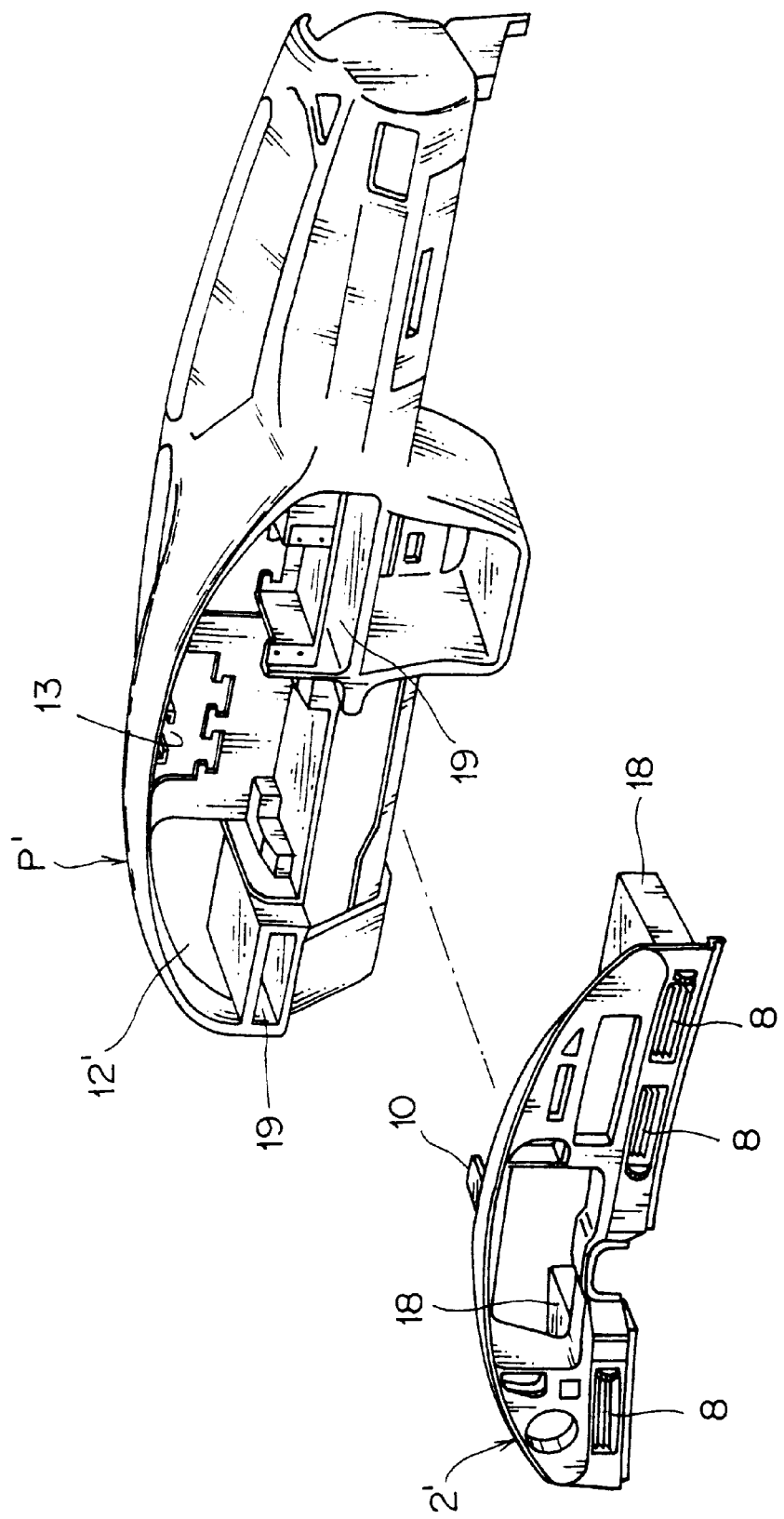
FIG. 3 is a perspective view of a finish panel and an instrument panel which are used with a method according to another embodiment of this invention.
Figure 4:
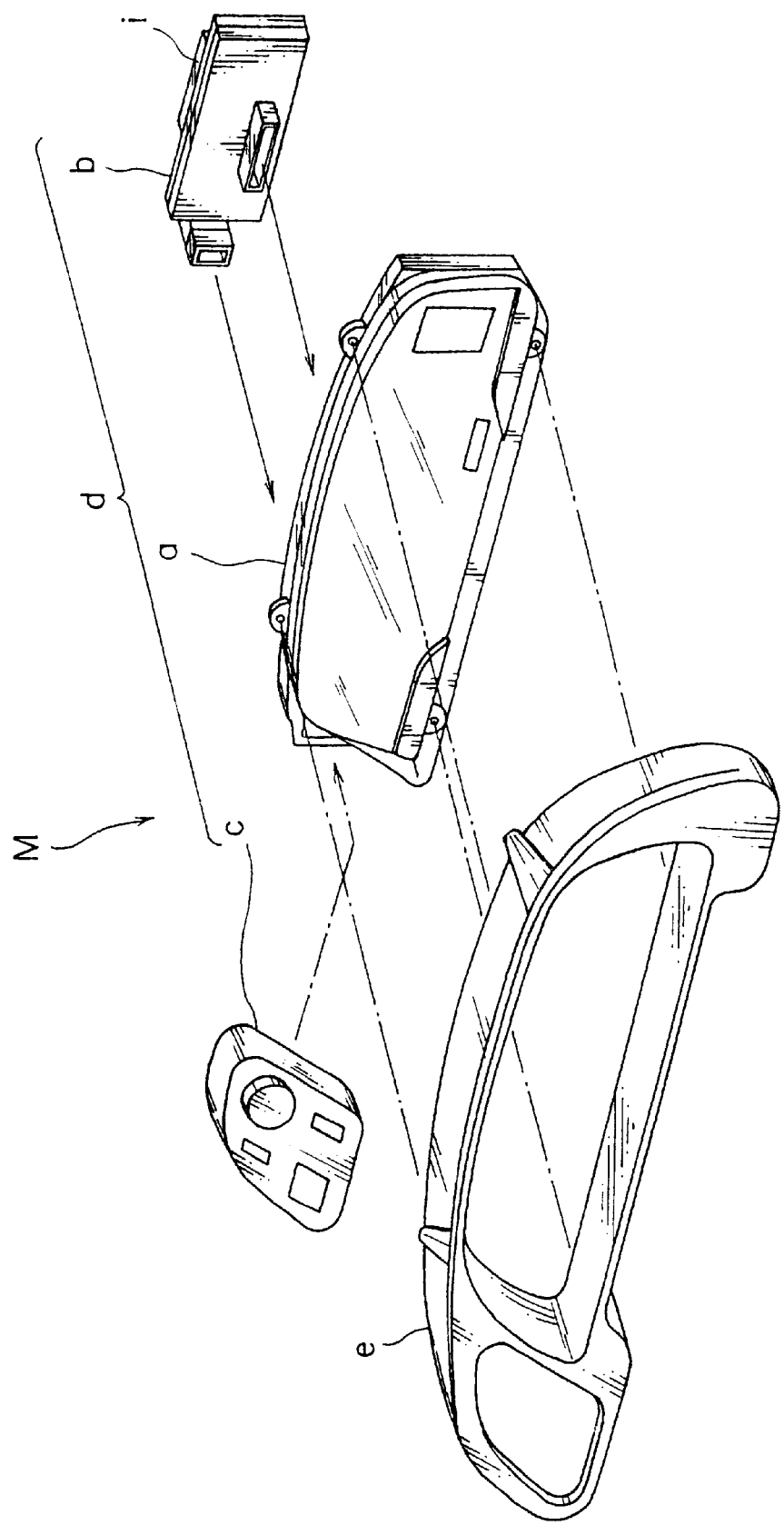
FIG. 4 is a perspective view of a conventional meter module, shown exploded.
Figure 5:
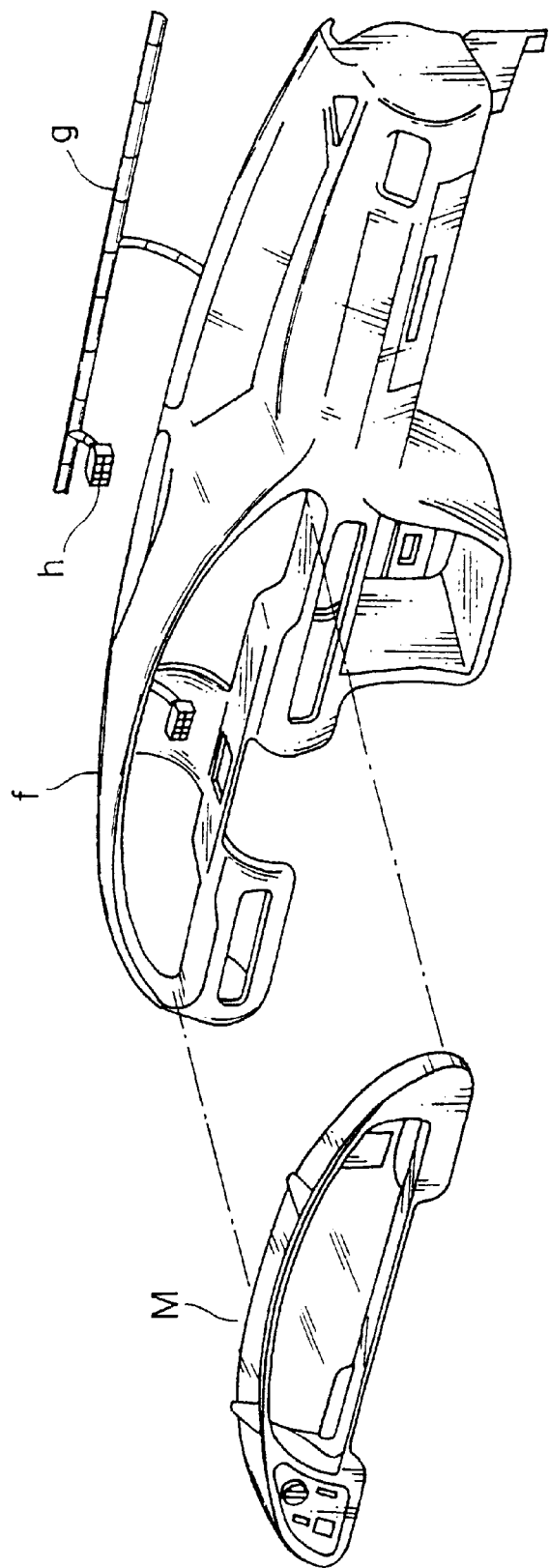
FIG. 5 is a perspective view showing the state in which the meter module of FIG. 4 is being fitted into an instrument panel.

Reference is now made to FIG. 3, which shows a meter-module finish panel 2' and a corresponding instrument panel P' according to another embodiment of this invention.

The finish panel 2' is at a lower portion thereof provided with defroster openings 8, and on the rear wall at positions corresponding to defroster openings 8 provided with defroster hoods 18 each of which projects towards the instrument panel P'. The meter-module receiving portion 12' of the instrument panel P', on the other hand, is therein provided with defroster duct outlets 19 each of which is of such size as to fit over a related one of the defroster hoods 18. Other structural features are the same as those in the first embodiment of this invention, and their description will be omitted.

To assemble the meter module with the finish panel 2' as mentioned above to the instrument panel P', the defroster hoods 18 of the finish panel 2' are first fitted into defroster duct outlets 19 of the instrument panel P', so as to facilitate the positioning of the meter module and the insertion of the guide projection 10 into the guide recess 13, thereby improving the working efficiency during assembly of the meter module to the vehicle.

While in the above examples, the first guide means (10) on an upper wall 9a of the meter module A, FIG. 1, is shown to be inserted into the second guide means (13) on a ceiling wall 12a of the meter-module receiving portion 12, 12', FIGS. 1,3 it is also possible to employ a structure in which the latter is inserted into the former to facilitate the fitting of the meter module A into the meter-module receiving portion 12, 12'.

Having now fully described the invention, it will be apparent to one of ordinary skill in the art that many changes and modifications can be made thereto without departing from the spirit and scope of the invention as set forth herein.

What is claimed is:

1. A method for assembling a meter module to a vehicle, comprising the steps of:

providing a meter module having a front surface, a back surface, a first guide element extending from the back surface, a defroster opening extending through the front surface and through the back surface, a defroster hood extending from the back surface and surrounding the defroster opening, switches, meters, electrical circuits for controlling the switches and meters, and an electrical connector;

providing a vehicle having a meter module receiving portion and a wiring harness, wherein the meter module receiving portion has;

(I) an inner peripheral wall with a second guide element thereon, and (II) an opening defining an outlet for a defroster duct, connecting said electrical connector to said wiring harness;

moving said meter module in a first direction toward said meter module receiving portion, thereby receiving said defroster hood within said opening; and then continually moving said meter module in said first direction, thereby causing said defroster hood to be further received within said opening while said second guide element is slidably engaged with said first guide element.

2. The method according to claim 1, wherein said meter module includes a meter module main body and a finish panel, and said first guide element is fixed on said finish panel.

3. A method for assembling a meter module to a vehicle, comprising the steps of:

providing a meter module having a front surface, a back surface, a first T cross-section shaped guide element extending from the back surface, a defroster opening extending through the front surface and through the back surface, a defroster hood extending from the back surface and surrounding the defroster opening, switches, meters, electrical circuits for controlling the switches and meters, and an electrical connector;

providing a vehicle having a meter module receiving portion and a wiring harness, wherein the meter module receiving portion has;

(I) an inner peripheral wall with a second guide element comprising a complementary recess for receiving said first T cross-section shaped guide element thereon, and (II) an opening defining an outlet for a defroster duct, connecting said electrical connector to said wiring harness, moving said meter module in a first direction toward said meter module receiving portion, thereby receiving said defroster hood within said opening; and then continually moving said meter module in said first direction, thereby causing said defroster hood to be further received within said opening while said second guide element slidably receives said first T cross-section shaped guide element.

4. The method according to claim 3, wherein said meter module includes a meter module main body and a finish panel, and said first T cross-section shaped guide element is fixed on said finish panel.

* * * * *